(No Model.)
R. T. ALLINSON.
OYSTER TONGS.
No. 337,358. Patented Mar. 9, 1886.
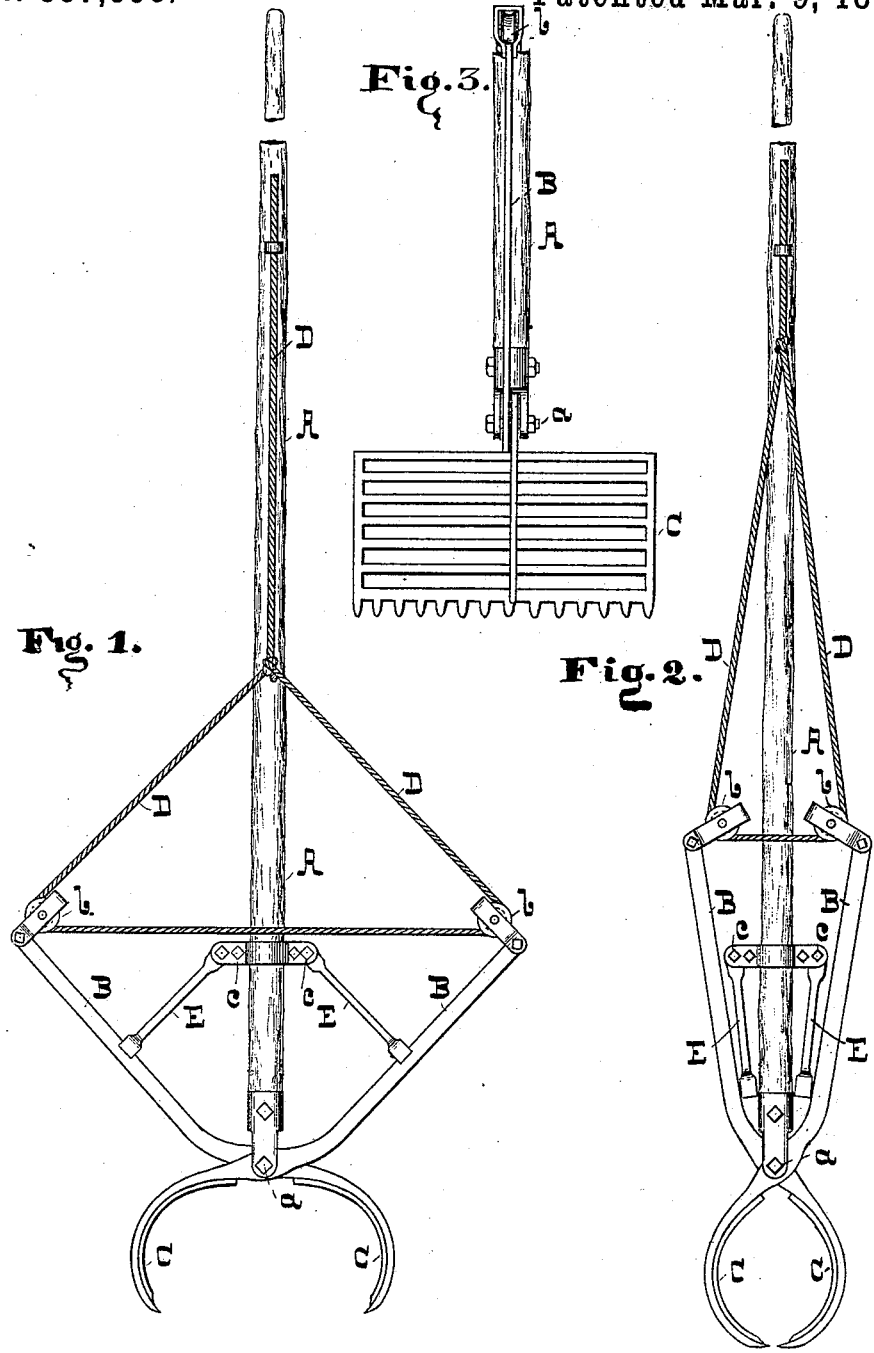
WITNESSES
Danl Fisher
Chas. W. Arnold.
INVENTOR
Robert T. Allinson,
by G. H. & W. J. Howard,
attys.

UNITED STATES PATENT OFFICE.

ROBERT T. ALLINSON, OF SOLOMON'S ISLAND, MARYLAND.

OYSTER-TONGS.

SPECIFICATION forming part of Letters Patent No. 337,358, dated March 9, 1886.

Application filed August 1, 1885. Serial No. 173,239. (No model.)

*To all whom it may concern:*

Be it known that I, ROBERT T. ALLINSON, of Solomon's Island, in the county of Calvert and State of Maryland, have invented certain Improvements in Oyster-Tongs, of which the following is a specification.

This invention relates to certain improvements in tongs for gathering oysters in deep water, as will hereinafter appear.

In the drawings forming a part hereof, Figure 1 is a side view of the improved tongs extended, and Fig. 2 a similar view of the same closed. Fig. 3 is a front view of the lower portion of the invention.

A is a pole of sufficient length to reach to the bottom of the river or creek from which the oysters are to be gathered, and at the same time project somewhat above the water.

B B are crossed arms, pivoted to the pole A at $a$, and provided with rakes C at their lower ends. The upper ends of the arms B are connected by a cord or rope, D, which passes around pulleys or sheaves $b$ at the upper ends of the arms B, and extends above the top of the pole A.

E E are pawls hinged to the pole A at $c$, to retain the arms B and the rakes C in an extended position while the device is being lowered to the bottom of the river or creek.

The tongs are preferably supported by a gaff or boom extending from the mast of a vessel, and hoisted, when filled, by means of a windlas s, which is not shown.

In the operation of the invention the rakes are first extended and held in this position by means of the pawls E, the outer ends of which may enter notches in the arms B, if such notches are found necessary. The tongs are now lowered into the water until the extended rakes C come in contact with the oyster-bed. The pawls are then unhooked or disengaged from the arms B by bearing down on the pole A, which has the effect of distending the arms B and causing the pawls to fall, as shown in Fig. 2. The rope D is now drawn, which forces the arms B toward the pole and closes the rakes C. In this movement oysters are gathered into the rakes, and as the rope is hoisted the tongs, with the oysters contained between the rakes, are lifted out of the water and the oysters discharged.

I claim as my invention—

The pole A, pivoted arms B, rakes C, and pawls E, combined with the rope D, all arranged substantially as specified.

ROBT. T. ALLINSON.

Witnesses:
 DANL. FISHER,
 CHAS. W. ARNOLD.